United States Patent [19]
Schilling et al.

[11] Patent Number: 6,075,793
[45] Date of Patent: Jun. 13, 2000

[54] HIGH EFFICIENCY SPREAD SPECTRUM SYSTEM AND METHOD

[75] Inventors: Donald L. Schilling, Sands Point, N.Y.; Joseph Garodnick, Centerville, Mass.

[73] Assignee: Golden Bridge Technology, Inc., West Long Branch, N.J.

[21] Appl. No.: 09/020,105

[22] Filed: Feb. 6, 1998

[51] Int. Cl.[7] .................................................. H04B 7/216

[52] U.S. Cl. ........................ 370/441; 370/335; 370/342; 375/200

[58] Field of Search .................................. 370/320, 335, 370/342, 349, 350, 441, 464, 477, 479; 375/200, 355, 356

[56] References Cited

U.S. PATENT DOCUMENTS

| | | | |
|---|---|---|---|
| 5,081,643 | 1/1992 | Schilling | 375/1 |
| 5,109,390 | 4/1992 | Gilhousen et al. | 375/1 |
| 5,166,951 | 11/1992 | Schilling | 375/1 |

*Primary Examiner*—Dang Ton
*Assistant Examiner*—David R Vincent
*Attorney, Agent, or Firm*—David Newman; Chartered

[57] ABSTRACT

A multichannel-spread-spectrum system for communicating a plurality of data-sequence signals from a plurality of data channels using parallel chip-sequence signals in which fewer than all of the channels include header information. A header device concatenates a header to a first data-sequence signal on a first channel. Data-sequence signals in parallel channels are sent without a header, and are timed from the header in the first channel.

7 Claims, 4 Drawing Sheets

6,075,793

HIGH EFFICIENCY SPREAD SPECTRUM SYSTEM AND METHOD

BACKGROUND OF THE INVENTION

This invention relates to spread-spectrum communications, and more particularly to a highly efficient spread-spectrum system employing packets having multiple parallel spread-spectrum channels.

DESCRIPTION OF THE RELEVANT ART

In a spread-spectrum system, one method for constructing a spread-spectrum signal transmitted as a packet is to use a header to determine the sampling point of a matched filter, to time the fields of the received data, to determine the relative amplitudes of the in-phase component and quadrature-phase component of the received spread-spectrum signal for coherent detection, to detect multipath, and to provide the coefficients for maximal ratio combining. A typical frame of the spread-spectrum signal, transmitted as a packet or a frame of a continuous signal, is shown in FIG. 1 for the case where the processing gain (PG) is 192; that is, for the example where there are 192 chips/symbol. The term "packet" is used throughout this disclosure to indicate a packet signal, and also includes frames of continuous signals which define packets.

With reference to FIG. 1, the time difference of 605.5 $\mu$sec between fields is needed when one or both of the terminals, transmitter and receiver, is in motion at vehicular speeds. Other times are also good. Less time between headers may be better in a particular application, but typically requires more headers, and hence more overhead. For the example of FIG. 1, the Doppler shift of the received signal requires more frequent updates the faster one of the terminal moves. The example shown in FIG. 1 is for a system operating at 2 GHz, a vehicle at 60 miles per hour, and binary-phase-shift-keying (BPSK) modulation. The length of the headers, 31 and 15 symbols, is determined by the required signal-to-noise ratio of the headers to provide accurate enough references for coherent demodulation.

For the example of FIG. 1, 256 symbols are used for headers, leaving 256 symbols for data. Thus, this channel is only 50% efficient. In addition, the maximum data rate, including bearer data, signaling, power control, etc., is 25.6 kbps uncoded.

One solution offered in the prior art is to use a lower processing gain, for example, 96. Then, there would be 1024 symbols per frame and the maximum data rate would increase to 51.2 kbps. The channel, however, would still be only 50% efficient. The headers would have to increase symbol length to make up for the loss in processing gain. Also, if orthogonal codes were used, then the number of users would be limited to 96.

Another method offered by prior art is to use parallel spread-spectrum channels, with each channel defined by a different chip-sequence signal. In this method, by using multiple correlators or matched filters, orthogonal codes are sent simultaneously, thereby increasing the data rate while still enjoying the advantage of a high processing gain. The multiple spread-spectrum channels merely behave as multiple users to a single location. However, the efficiency remains at 50%.

SUMMARY OF THE INVENTION

A general object of the invention is to increase data transmission efficiency by sending data through parallel spread-spectrum channels while including headers in fewer than all of the channels.

The present invention broadly includes a multichannel-spread-spectrum system for communicating a plurality of data-sequence signals from a plurality of data channels, over a communications channel. The multichannel-spread-spectrum system includes, at a transmitter, a header device, a processor, a chip-sequence generator, a plurality of product devices, a combiner, and a transmitter subsystem. At a receiver, the system may further include a translating device, a header-matched filter, a receiver processor, and a plurality of data-matched filters.

At the transmitter, the header device concatenates a header to a first data-sequence signal on the first data-sequence channel to generate a header frame. As used herein, a "header frame" is defined to be a header followed by data and may include multiple headers interspersed with fields of data. Timing is keyed from the header. The processor generates control and timing signals for synchronization of the second, third through the nth data-sequence channels to the header. The chip-sequence generator generates a plurality of chip-sequence signals, with each chip-sequence signal orthogonal to the other chip-sequence signals of the plurality of chip-sequence signals. A plurality of product devices multiplies the output from the header device, and each of the remaining data-sequence signals, by a respective chip-sequence signal, thereby generating a plurality of spread-spectrum channels. The plurality of spread-spectrum channels includes a spread-spectrum-header channel and a plurality of spread-spectrum-data channels. The spread-spectrum-header channel is generated by processing the header frame with a first chip-sequence signal. Each of the plurality of spread-spectrum-data channels is generated by processing a respective data-sequence signal by a respective chip-sequence signal. The combiner algebraically combines the plurality of spread-spectrum channels as a multichannel-spread-spectrum signal. The transmitter subsystem transmits the multichannel-spread-spectrum signal on a carrier frequency using radio waves over the communications channel.

At the receiver, the translating device translates the received multichannel-spread-spectrum signal from the carrier frequency to a processing frequency. The header-matched filter has an impulse response matched to the header. The header-matched filter detects, at the processing frequency, the header in the multichannel-spread-spectrum signal and outputs, in response to detecting the header, a header-detection signal. The receiver processor, in response to the header-detection signal, generates control and timing signals. Each data-matched filter of the plurality of data-matched filters has an impulse response matched to a respective chip-sequence signal of the plurality of chip-sequence signals. The plurality of data-matched filters despreads the received multichannel-spread-spectrum signal as a plurality of received spread-spectrum channels.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
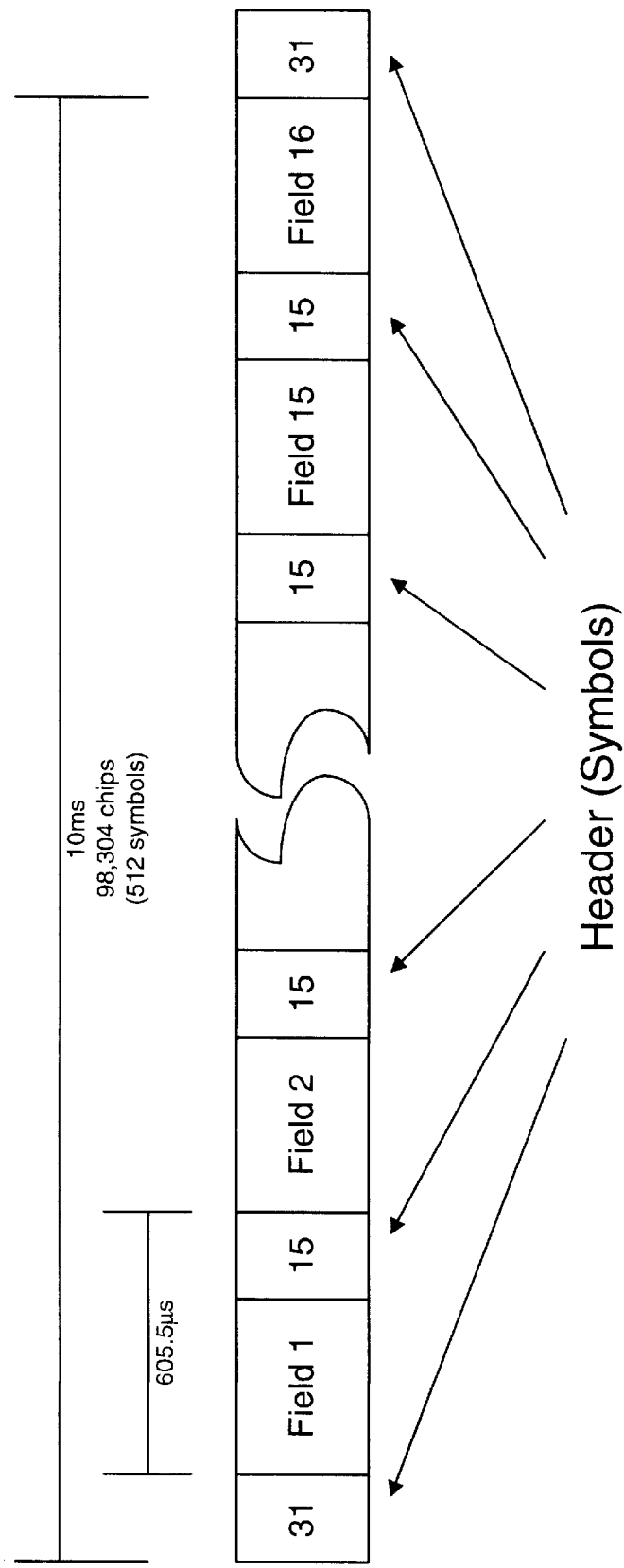
FIG. 1 illustrates a prior art packet or frame of a spread-spectrum signal.

Reference now is made in detail to the present preferred embodiments of the invention, examples of which are illustrated in the accompanying drawings, wherein like reference numerals indicate like elements throughout the several views.

Figure 2:
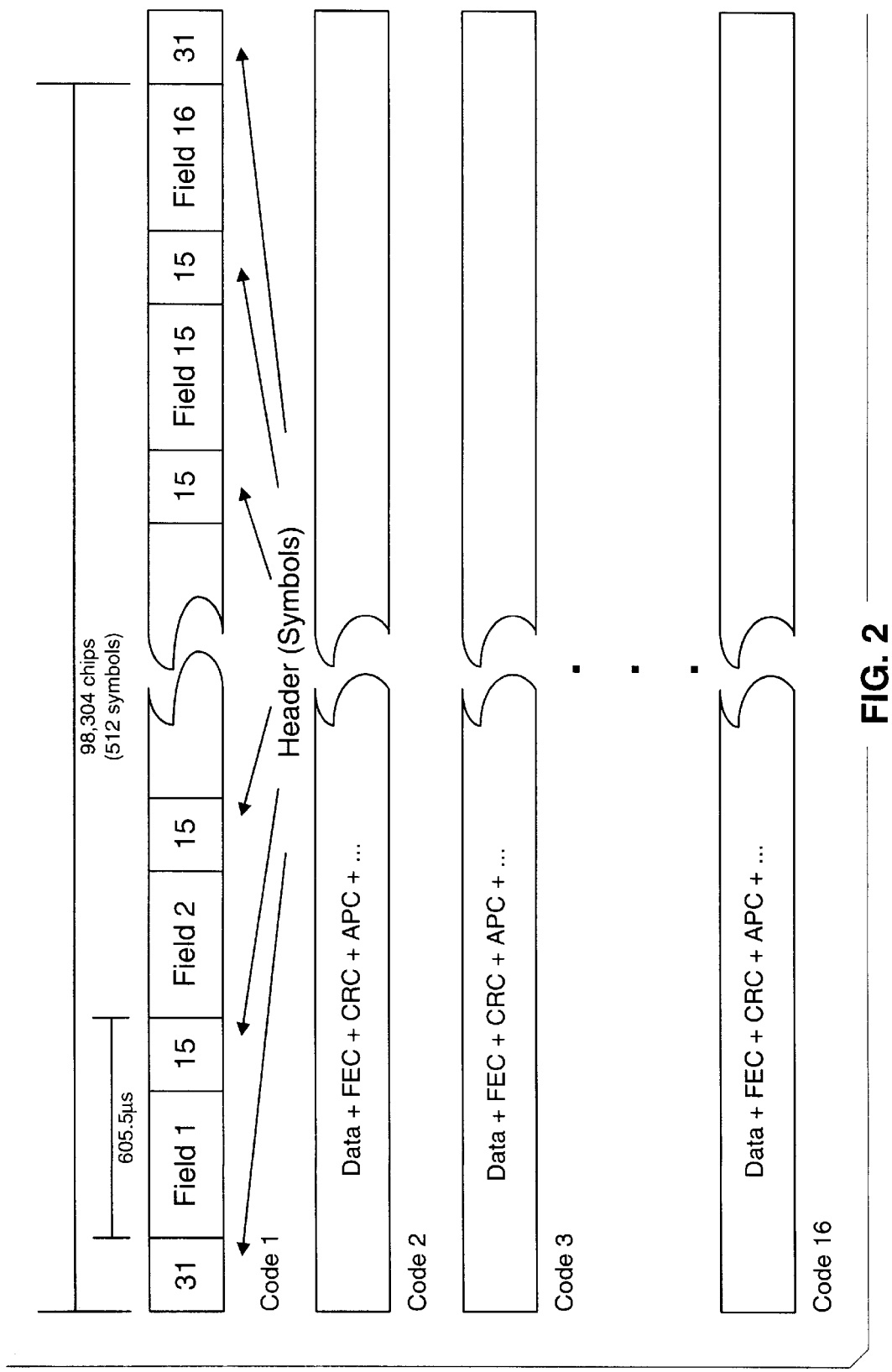
FIG. 2 shows a spread-spectrum signal employing multiple parallel spread-spectrum channels, having a header for timing on only the first spread-spectrum channel.

The present invention provides a novel multichannel spread-spectrum system and method for communicating on a plurality of data channels using parallel spread-spectrum channels. With the present invention, increased efficiency is obtained by including header information in fewer than all the channels. Effectively, instead of replicating the frame format shown in FIG. 1 for each spread-spectrum channel, only one frame contains headers while the other spread-spectrum channels sent in parallel with different chip-sequence signals devote the entire time for data, as shown in FIG. 2. The remaining spread-spectrum channels are synchronized to the first channel by a processor. Therefore, the efficiency is increased. One or more spread-spectrum channels, but less than the total number of spread-spectrum channels, could have a header for synchronization. The use of one spread-spectrum channel with a header, however, would be more efficient. For example, a system constructed for 384 kbps data rate, FEC rate ½ convolutional coding, 25.6 kbps maintenance channel for power control, CRC, etc., and processing gain of 192, utilizes 16 parallel chip-sequence signals and yields a 96.9% efficiency.

The multichannel spread-spectrum system might be used as part of a radio-based Ethernet system, or an ATM system, or any other networked system. The multichannel spread-spectrum system could be used for connection as well as connectionless applications. The multichannel spread-spectrum system includes a multichannel spread-spectrum transmitter, and may also include a multichannel spread-spectrum receiver.

The present invention is for a multichannel spread-spectrum link which, in a preferred embodiment, is from a user to the base station. The present invention is illustrated, by way of example, with a multichannel spread-spectrum transmitter transmitting the multichannel spread-spectrum signal to a multichannel spread-spectrum receiver.

The multichannel spread-spectrum signal, in a preferred embodiment, includes a header, in a first data-sequence channel, followed in time by the first data-sequence signal. The header is concatenated with the first data-sequence signal to generate a header frame. As used herein, a "header frame" is defined to be a header followed by data and may include multiple headers interspersed with fields of data.

The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user-defined and, in a usual practice, is used with a header-symbol-sequence signal. The header, in a preferred embodiment, includes a chip-sequence signal used for the purpose of synchronization.

Each spread-spectrum channel of the multichannel-spread-spectrum signal is generated similarly, from techniques well known in the art as used for the header, by spread-spectrum processing a data-sequence signal with a respective chip-sequence signal. The first chip-sequence signal is generated from a first code (code 1). A second spread-spectrum channel is defined by a second chip-sequence signal, which is generated from a second code (code 2). Similarly, a third spread-spectrum channel is defined by a third chip-sequence signal, which is generated from a third code (code 3).

The data-sequence signal may be derived from data, or an analog signal converted to data, signaling information, or other source of data symbols or bits. The chip-sequence signal can be user defined, and preferably is orthogonal to other chip-sequence signals used for generating the plurality of spread-spectrum channels. Demultiplexing data, spread-spectrum modulating each demultiplexed channel as a spread-spectrum signal and forming a multichannel spread-spectrum signal, keeps processing gain (PG) constant, independent of data rate. For a high data rate, for example, the multichannel spread-spectrum signal may include 128 channels. Sixty-four channels may be on an in-phase component and sixty-four channels may be on a quadrature-phase component.

The present invention broadly comprises a multichannel spread-spectrum system for communicating data between a plurality of multichannel spread-spectrum transmitters and a plurality of multichannel spread-spectrum receivers, preferably using radio waves. The terms "multichannel spread-spectrum transmitter" and "multichannel spread-spectrum receiver", as used herein, denote the overall system components for transmitting and receiving, respectively, data.

Each multichannel spread-spectrum transmitter includes header means, processor means, transmitter--spread-spectrum means, combiner means, and transmitter-carrier means. The header means is coupled to the processor means. The transmitter-spread-spectrum means is coupled to the header means and to a plurality of data channels. The combiner means is coupled between the transmitter-spread-spectrum means and the transmitter-carrier means.

The header means is coupled to a first channel of the plurality of data channels. The header means concatenates a header for chip-sequence synchronization to the first data-sequence signal of the plurality of data sequence signals to generate a header frame. The header is for chip-sequence synchronization.

The processor means is coupled to the header means and to each of remaining channels of the plurality of data channels. Responsive to the header, the processor means generates control and timing signals to synchronize the plurality of data channels to the header.

The transmitter-spread-spectrum means spread-spectrum processes each of the data-sequence signals, as well as the header frame, with a respective chip-sequence signal. The output of the transmitter-spread-spectrum means is a plurality of spread-spectrum channels, with each spread-spectrum channel corresponding to one of the data inputs. The plurality of spread-spectrum channels includes a spread-spectrum-header channel and a plurality of spread-spectrum-data channels. The spread-spectrum channel is generated by processing the header frame with a first chip-sequence signal. Each of the plurality of spread-spectrum-data channels is generated by processing a respective data-sequence signal by a respective chip-sequence signal.

The combiner means algebraically combines the plurality of spread-spectrum channels as a multichannel-spread-spectrum signal. At the output of the combiner means is the multichannel spread-spectrum signal. The transmitter-carrier means transmits, at a carrier frequency, the multichannel spread-spectrum signal, using radio waves, over a communications channel.

Each of the multichannel spread-spectrum receivers includes translating means, header-detection means, processor means, and receiver-spread-spectrum means. The translating means is coupled to the communications channel. The header-detection means is coupled between the translating means and the processor means. The receiver-spread-spectrum means is coupled to the translating means. At the output of the receiver-spread-spectrum means are the received data.

The translating means translates the received multichannel spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the header embedded in the spread-spectrum-header channel of the multichannel spread-spectrum signal. The header-detection means outputs, in response to detecting the header, a header-detection signal.

The receiver-processor means generates control and timing signals from the detected header. These signals are used for controlling sequences and timing of the invention.

The receiver-spread-spectrum means despreads the multichannel spread-spectrum signal of the multichannel spread-spectrum signal, as a plurality of data signals.

Figure 3:
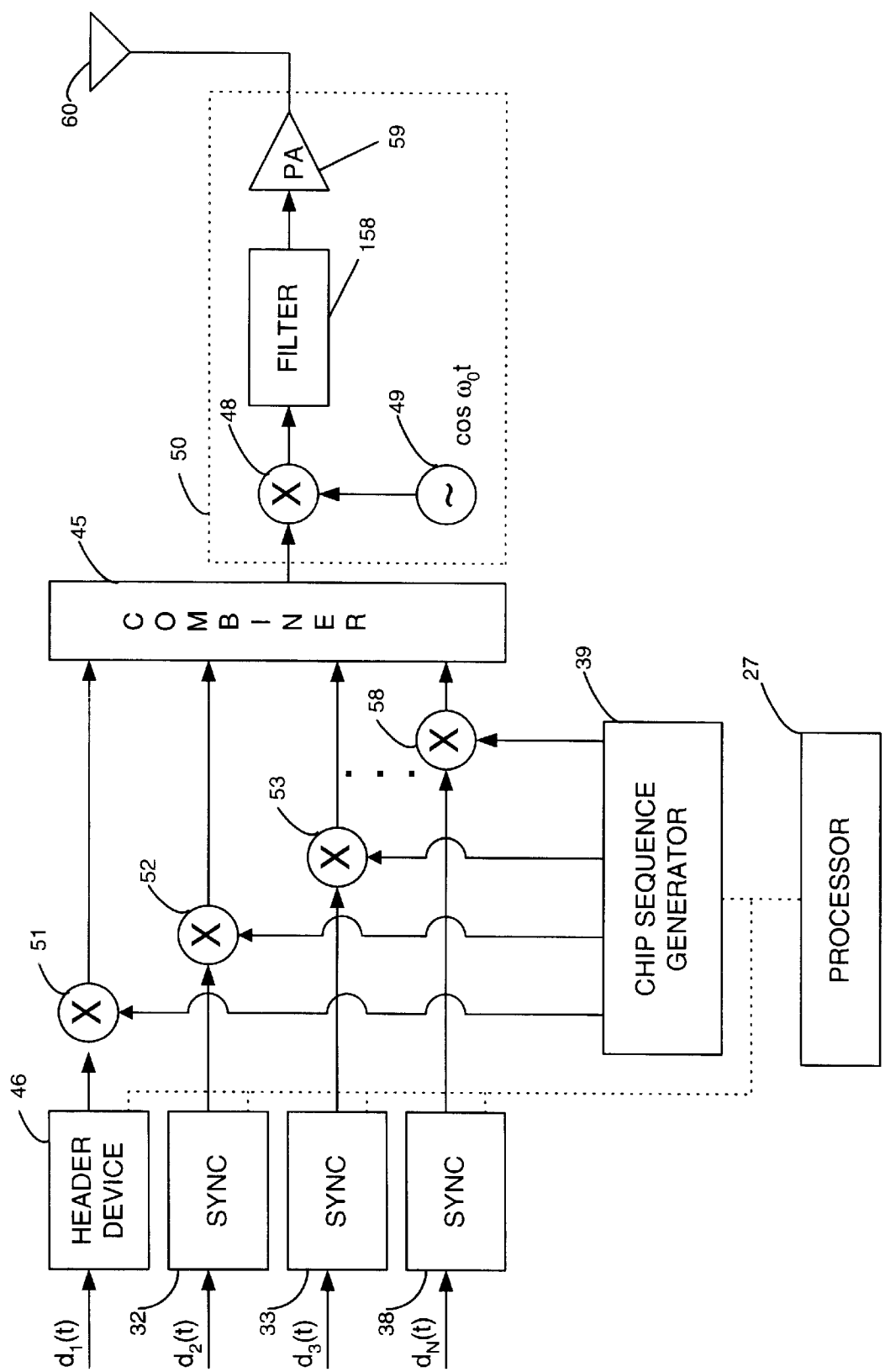
FIG. 3 is a block diagram of a multichannel spread-spectrum transmitter.

The transmitter-spread-spectrum means, as illustratively shown in FIG. 3, is embodied as a chip-sequence means and a plurality of product devices 51–58. The chip-sequence means may be embodied as a chip-sequence generator 39 for generating a plurality of chip-sequence signals. Alternatively, the transmitter-spread-spectrum means may be embodied as a plurality of EXCLUSIVE-OR gates, or equivalent logic devices or circuitry, coupled between the plurality of data inputs and a memory device for storing the plurality of chip-sequence signals. In this embodiment, the memory device outputs a respective chip-sequence signal to the respective data-sequence signal. A third alternative may include having the transmitter-spread-spectrum means embodied as a memory device, with appropriate detection circuitry so that, in response to a particular data symbol or data bit at the output of a particular output the demultiplexer, a chip-sequence signal is substituted for that data symbol or data bit. The transmitter-spread-spectrum means may also be embodied as any other technology known in the art capable of outputting a plurality of chip-sequence signals.

The combining means is embodied as a combiner 45. The header means is embodied as a header device 46 for concatenating a header with data in the first data channel. The processor means is embodied as a processor 27. The transmitter-carrier means is embodied as a transmitter-carrier subsystem 50. The transmitter-carrier subsystem 50 may include an oscillator 49 and multiplier device 48 for shifting a signal to a carrier frequency, a filter 58 for filtering the shifted signal, and a power amplifier 59 and/or other circuitry as is well known in the art for transmitting a signal over a communications channel. The signal is transmitted using an antenna 60.

As shown in FIG. 3, the header device 46 is coupled between the first data channel and the first product device 51. The chip-sequence generator 39 is coupled to the plurality of product devices 51–58 and to the processor 27. The combiner 45 is coupled between the plurality of product devices 51–58 and the transmitter-carrier subsystem 50.

The header device 46 concatenates the header with data using a first data channel of a plurality of data channels. The header device 46 is necessary for timing of data from different data channels. From timing the data from the header in a single channel, data in all channels are timed. A plurality of synchronization devices, which may be embodied as buffer memories 32–38, receive timing and control signals from the processor 27 to synchronize the plurality of data channels to the header on the first data channel.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals. The chip-sequence generator 39 equivalently may be embodied as a plurality of chip-sequence generators.

The plurality of product devices 51–58, for example, may be embodied as a plurality of EXCLUSIVE-OR gates coupled between the incoming data channels and the chip-sequence generator 39. Each EXCLUSIVE-OR gate multiplies a respective data-sequence signal by a respective chip-sequence signal from the chip-sequence generator 39.

The plurality of product devices 51–58 multiplies each of the data-sequence signals by a respective chip-sequence signal. At the output of the plurality of product devices 51–58 is a plurality of spread-spectrum channels, respectively. A particular spread-spectrum channel is identified by the chip-sequence signal that was used to spread-spectrum process the particular data sequence signal. The plurality of spread-spectrum channels includes a spread-spectrum-header channel and a plurality of spread-spectrum-data channels. The spread-spectrum-header channel is generated by processing the header frame with a first chip-sequence signal. Each of the plurality of spread-spectrum-data channels is generated by processing a respective data-sequence signal with a respective chip-sequence signal. The plurality of spread-spectrum-data channels is synchronized to the spread-spectrum-header channel.

The combiner 45 algebraically combines the plurality of spread-spectrum channels, and outputs the combined signal as a multichannel-spread-spectrum signal. Preferably, the combiner 45 combines the plurality of spread-spectrum channels linearly, although some nonlinear process may be involved without significant degradation in system performance.

The transmitter-carrier subsystem 50 transmits, at a carrier frequency, the multichannel spread-spectrum signal using radio waves over a communications channel. The transmitter-carrier subsystem 50 of the multichannel spread-spectrum transmitter includes appropriate filters, power amplifiers and matching circuits coupled to an antenna 60. The transmitter-carrier subsystem 50 also may include a hard limiter, for hard limiting the multichannel spread-spectrum signal before transmitting.

Figure 4:
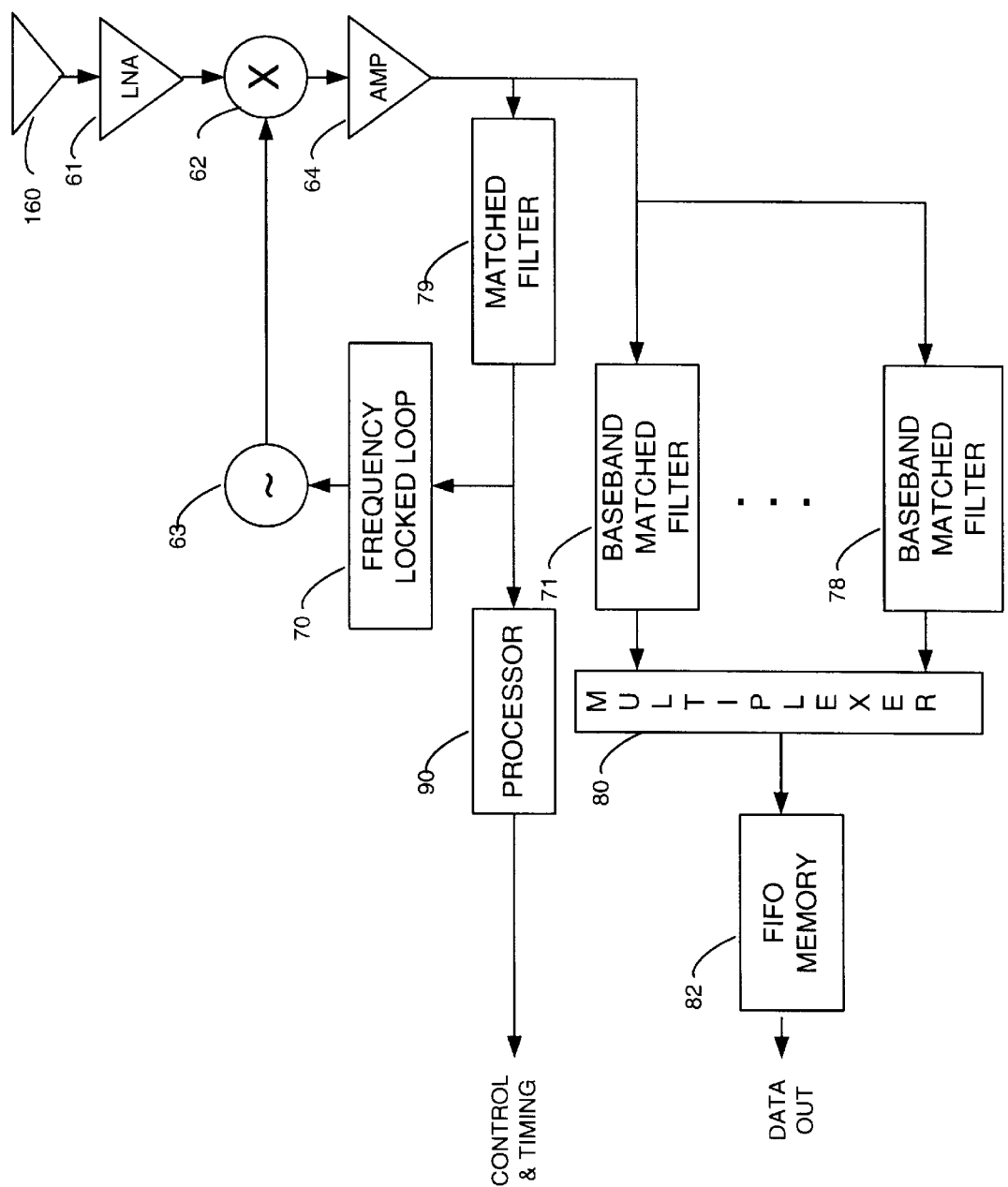
FIG. 4 is a block diagram of a multichannel spread-spectrum receiver.

At the receiver, as shown in FIG. 4, the translating means is shown as receiver RF section, which may include a translating device 62 with oscillator 63 and frequency-locked loop 70. The translating device 62 is coupled through a low noise amplifier 61 to an antenna 160 to the communications channel and through an amplifier 64 to the header-matched filter 79. The translating device 62 is coupled to the oscillator 63, and the oscillator 63 is coupled to the frequency-locked loop 70. The header-matched filter 79 is coupled to the frequency-locked loop 70 and to a processor 90. The plurality of data-matched filters 71–78 is coupled between the translating device 62 and a multiplexer 80. The multiplexer 80 is coupled to a receiver-FIFO memory 82.

The translating device 62 translates the received multichannel spread-spectrum-spread-spectrum signal from the carrier frequency to a processing frequency. The translating device 62 may be a mixer, which is well known in the art, for shifting an information signal, which in this disclosure is the received multichannel spread-spectrum signal modulated at a carrier frequency, to IF or baseband. The processing frequency may be RF, IF, baseband frequency or other desired frequency for a digital signal processor. The signal for shifting the received multichannel spread-spectrum-spread-spectrum signal is produced by oscillator 63.

The header-detection means is embodied as a header-matched filter 79. The header-matched filter 79 detects, at the processing frequency, the header embedded in the spread-spectrum-header channel of the multichannel spread-spectrum signal. The term "header-matched filter" as used herein, is a matched filter for detecting the header, by having an impulse response matched to the chip-sequence signal and bits of the header of the spread-spectrum-header channel of the multichannel spread-spectrum signal. The header-matched filter may be a digital-matched filter, a surface-acoustic-wave (SAW) device, software operating in a processor or embodied within an application specific integrated circuit (ASIC). In response to detecting the header, the header-matched filter 79 outputs a header-detection signal. The header-matched filter at a base station can detect the header embedded in the multichannel spread-spectrum signal from all users, since the chip-sequence signal for the header and data is common to all users.

The header-detection means alternatively may be embodied as a header-matched filter, coupled to an output of a data-matched filter or to the output of the multiplexer 80. This alternative is taught in U.S. Pat. No. 5,627,855, entitled PROGRAMMABLE TWO-PART MATCHED FILTER FOR SPREAD SPECTRUM by Davidovici, which is incorporated herein by reference.

The frequency-locked loop 70 is frequency locked in response to the header-detection signal. The frequency-locked loop 70 locks the frequency of the oscillator 63 to the carrier frequency of the received multichannel spread-spectrum signal. Circuits for frequency locked loops, and their operation, are well known in the art.

The processor means is embodied as a processor 90. The processor 90, in response to the header-detection signal, generates control and timing signals. The control and timing signals are used for controlling sequences and timing of the invention.

The receiver-spread-spectrum means is embodied as a plurality of data-matched filters 71–78. Each of the plurality of data-matched filters 71–78 has an impulse response matched to a chip-sequence signal of a respective one of the plurality of chip-sequence signals. The data-matched filters may be embodied as a digital-matched filter, SAW device, software operating in a processor, or an ASIC. The plurality of data-matched filters 71–78 despreads the multichannel-spread-spectrum signal as a plurality of received spread-spectrum channels.

Alternatively, the receiver-spread-spectrum means and the transmitter-spread-spectrum means may be embodied as the plurality of data-matched filters 71–78, thereby using the same hardware. The plurality of data-matched filters 71–78 in this embodiment are time multiplexed with different coefficients, between transmit and receive.

Each chip-sequence signal in the plurality of chip-sequence signals is different, preferably orthogonal to the others, to avoid or reduce interference. The plurality of chip-sequence signals, however, preferably is common to all users. Thus, the plurality of data-matched filters 71–78 can detect the plurality of chip-sequence signals from any of the users.

The present invention also comprises a method. The method includes the steps of concatenating a header to a first data-sequence signal of a plurality of data sequence signals to generate a header frame. A used herein, a "header frame" is defined to be a header followed by data and may include multiple headers interspersed with fields of data.

The input data are in a plurality of data-sequence signals. The plurality of data-sequence signals are synchronized to the header responsive to control and timing signals generated by a processor. The method includes generating a plurality of chip-sequence signals, and multiplying each of the data-sequence signals by a respective chip-sequence signal, thereby generating a plurality of spread-spectrum channels. The plurality of spread-spectrum channels includes a spread-spectrum-header channel and a plurality of spread-spectrum-data channels. The spread-spectrum-header channel is generated by processing the header frame with a first chip-sequence signal. Each of the plurality of spread-spectrum-data channels is generated by processing a respective data-sequence signal with a respective chip-sequence signal. Each of the plurality of spread-spectrum-data channels is synchronized to the spread-spectrum-header channel.

The steps include algebraically combining the plurality of spread-spectrum channels as a multichannel-spread-spectrum signal, and transmitting on a carrier frequency the multichannel spread-spectrum signal over a communications channel using radio waves.

The steps may further include, at a multichannel spread-spectrum receiver, translating the multichannel spread-spectrum signal from the carrier frequency to a processing frequency, and detecting, at the processing frequency, the header embedded in the multichannel spread-spectrum signal. The chip-sequence signals used for the header and the data may be common to all users. In response to detecting the header, the method includes outputting a header-detection signal and generating control and timing signals.

The steps also include despreading the multichannel-spread-spectrum signal as a plurality of received spread-spectrum channels.

In the present invention, assume 800 kb/s is first demultiplexed into K channels, where K=32 in a preferred system, although any K will suffice. As a result, if K=32, then the transmitted rate is $f_T$=25 kb/s. Each of these K channels is spread using a different orthogonal spread-spectrum code of length L. Thus, $$\int_0^{T_L} C_i(t)C_j(t)dt = \begin{matrix} 1 & i=j \\ 0 & i \ne j \end{matrix}$$

over the time, $T_L$, corresponding to the code length L. For example, if the chip rate were 5 megachips/s, and there were eight users, then the send rate is 6.4 Mb/s 32=200 kb/s so that processing gain is 25.

Note that the processing gain has increased by a factor of 32. Further, the length L of each of the K orthogonal codes is such that $L \ge K$, since there are only L orthogonal codes of length L.

One-half of the chip-sequence signals may be sent on an in-phase (I) channel and one-half on a quadrature-phase (Q) channel, forming quadrature-phase-shift-keying modulation (QPSK) or OQPAK. Binary-phase-shift-keying modulation (BPSK) can also be used. These are standard modulation procedures well known in the prior art.

Different sectors and different cells should use different orthogonal chip sequences to minimize interference between sectors and cells. This is done by multiplying each chip sequence signal, $C_i$, by a chip sequence, $g_j(t)$. Within a sector, every user uses the same codeset, $C_i$ and $g_j$. Within each sector of each cell, each user uses the same codeset, $C_i$, but each sector in each cell gets a different $g_j$.

Users transmitting at different rates use a subset of the 32 codes so that the processing gain remains a constant.

If 2 Mb/s were the basic data rate, then with FEC and overhead the data rate might be $f_d$=4.4 Mb/s. In this case to achieve a processing gain of twenty-five (PG=25) at say f=10 Mchips/s requires:

$$25 = Kf_c/f_d \times 8$$

or $$K = 200 f_d/f_c = 200 \times 4.4/10 = 88$$

The use of 88 orthogonal codes each of length 88 is certainly within the state-of-the art.

It will be apparent to those skilled in the art that various modifications can be made to the high efficiency spread spectrum packet system of the instant invention without departing from the scope or spirit of the invention, and it is intended that the present invention cover modifications and variations of the high efficiency spread spectrum packet system provided they come within the scope of the appended claims and their equivalents.

We claim:

1. A multichannel-spread-spectrum system for communicating a plurality of data-sequence signals from a plurality of data channels using parallel chip-sequence signals, comprising:

a header device, coupled to a first data channel of said plurality of data channels, for concatenating a header to a first data-sequence signal;

a processor for synchronizing a remaining plurality of data channels to the header in the first data channel;

chip-sequence means for outputting a plurality of chip-sequence signals, with each chip-sequence signal orthogonal to the other chip-sequence signals in said plurality of chip-sequence signals;

a plurality of product devices, coupled to said chip-sequence means, for multiplying each of said plurality of data-sequence signals by a respective chip-sequence signal, thereby generating a plurality of spread-spectrum channels, respectively;

a combiner, coupled to the plurality of product devices, for algebraically combining the plurality of spread-spectrum channels as a multichannel-spread-spectrum signal;

a transmitter subsystem, coupled to said combiner, for transmitting the multichannel-spread-spectrum signal on a carrier frequency over a communications channel;

a translating device, coupled to the communications channel, for translating the received multichannel-spread-spectrum signal from the carrier frequency to a processing frequency;

a header-matched filter, coupled to said translating device and having an impulse response matched to the header, for detecting, at the processing frequency, the header in the multichannel-spread-spectrum signal, and for outputting, responsive to detecting the header, a header-detection signal;

a receiver processor, coupled to said header-matched filter, responsive to the header-detection signal, for generating control and timing signals; and a plurality of data-matched filters, coupled to said translating device, with each data-matched filter having an impulse response matched to a respective chip-sequence signal of the plurality of chip-sequence signals, for despreading the received multichannel-spread-spectrum signal as a plurality of received spread-spectrum channels, respectively.

2. The multichannel-spread-spectrum system as set forth in claim 1, with said chip-sequence means including a chip-sequence generator for generating the plurality of chip-sequence signals.

3. The multichannel-spread-spectrum system as set forth in claim 1, with said chip-sequence means including a memory for storing the plurality of chip-sequence signals.

4. The multichannel-spread-spectrum system as set forth in claim 1, said plurality of product devices including:

a first EXCLUSIVE-OR gate, coupled to said chip-sequence means and to said header device, for multiplying the header and a first data-sequence signal with a first chip-sequence signal to generate a spread-spectrum-header channel;

a second EXCLUSIVE-OR gate, coupled to said chip-sequence means and to a second data channel, for multiplying a second data-sequence signal by a second chip-sequence signal, the second chip-sequence signal being different from the first chip-sequence signal, to generate a first spread-spectrum-data channel;

a third EXCLUSIVE-OR gate, coupled to said chip-sequence means and to a third data channel, for multiplying a third data-sequence signal by a third chip-sequence signal, the third chip-sequence signal being different from the second chip-sequence signal and from the first chip-sequence signal, to generate a second spread-spectrum-data channel;

an nth EXCLUSIVE-OR gate, coupled to said chip sequence means and to an nth data channel, for multiplying an nth data-sequence signal by an nth chip-sequence signal, the nth chip-sequence signal being different from the third chip-sequence signal and from the second chip-sequence signal and from the first chip-sequence signal, to generate an nth−1 spread-spectrum-data channel; and the first spread-spectrum-data channel, the second spread-spectrum-data channel, and the nth−1 spread-spectrum-data channel synchronized, responsive to timing and control signals generated by the processor, to the spread-spectrum-header channel.

5. A multichannel-spread-spectrum transmitter for communicating a plurality of data-sequence signals from a plurality of data channels using parallel chip-sequence signals, comprising:

a header device, coupled to a first data channel of said plurality of data channels, for concatenating a header to a first data-sequence signal to generate a header frame;

a processor, coupled to the header device and to the plurality of data channels, for synchronizing the plurality of data channels;

spread-spectrum means, coupled to the plurality of data channels, for spread-spectrum processing the plurality of data-sequence signals by a plurality of chip-sequence signals, respectively, thereby generating a plurality of spread-spectrum channels, the plurality of spread-spectrum channels including a spread-spectrum-header channel generated by processing the header frame with a first chip-sequence signal, and a plurality of spread-spectrum-data channels;

combiner means, coupled to said spread-spectrum means, for algebraically combining the plurality of spread-spectrum channels as a multichannel-spread-spectrum signal; and carrier means, coupled to said combiner means, for transmitting the multichannel-spread-spectrum signal over a communications channel at a carrier frequency.

6. The transmitter as set forth in claim 5, said spread-spectrum means including:

means for generating the plurality of chip-sequence signals;

a first EXCLUSIVE-OR gate, coupled to said generating means and to said header device, for multiplying the header frame with the first chip-sequence signal to generate the spread-spectrum-header channel;

a second EXCLUSIVE-OR gate, coupled to said generating means and to a second data channel, for multiplying a second data-sequence signal by a second chip-sequence signal, the second chip-sequence signal being different from the first chip-sequence signal, to generate a first spread-spectrum-data channel;

a third EXCLUSIVE-OR gate, coupled to said generating means and to a third data channel, for multiplying a third data-sequence signal by a third chip-sequence signal, the third chip-sequence signal being different from the second chip-sequence signal and from the first chip-sequence signal, to generate a second spread-spectrum-data channel;

an nth EXCLUSIVE-OR gate, coupled to said generating means and to an nth data channel, for multiplying an nth data-sequence signal by an nth chip-sequence signal, the nth chip-sequence signal being different from the third chip-sequence signal and from the second chip-sequence signal and from the first chip-sequence signal, to generate an nth–1 spread-spectrum-data channel; and the first spread-spectrum-data channel, the second spread-spectrum-data channel, and the nth–1 spread-spectrum-data channel synchronized, responsive to timing and control signals generated by the processor, to the spread-spectrum-header channel.

7. A multichannel-spread-spectrum transmitter for communicating a plurality of data-sequence signals from a plurality of data channels using parallel chip-sequence signals, comprising:

a header device, coupled to a first data channel of said plurality of data channels, for concatenating a header to a first data-sequence signal to generate a header frame;

a processor, coupled to the header device and to the plurality of data channels, for synchronizing the plurality of data channels;

a chip-sequence generator for generating a plurality of chip-sequence signals, each of said plurality of chip-sequence signals being orthogonal to other chip-sequence signals within the plurality of chip-sequence signals;

a plurality of product devices, coupled to the plurality of data channels and to said chip-sequence generator, for multiplying the plurality of data-sequence signals by a plurality of chip-sequence signals, respectively, thereby generating a plurality of spread-spectrum channels, the plurality of spread-spectrum channels including a spread-spectrum-header channel and a plurality of spread-spectrum-data channels, the spread-spectrum-header channel generated by multiplying the header frame with a first chip-sequence signal, each of the plurality of spread-spectrum-data channels generated by multiplying a respective data-sequence signal by a respective chip-sequence signal;

a combiner, coupled to said plurality of product devices, for algebraically combining the plurality of spread-spectrum channels as a multichannel-spread-spectrum signal; and a transmitter subsystem, coupled to said combiner, for transmitting the multichannel-spread-spectrum signal over a communications channel at a carrier frequency.

* * * * *